July 1, 1958
F. S. LAPEYRE ET AL
2,840,850
SHRIMP PEELING MACHINE
Filed June 15, 1954
4 Sheets-Sheet 1
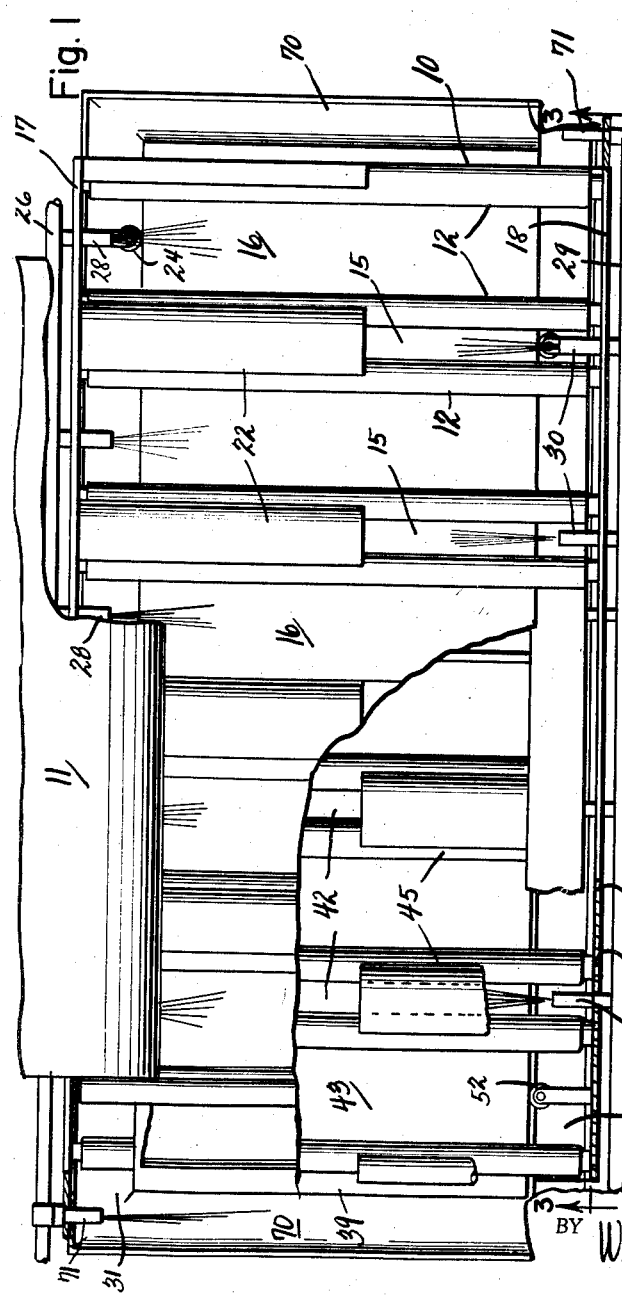
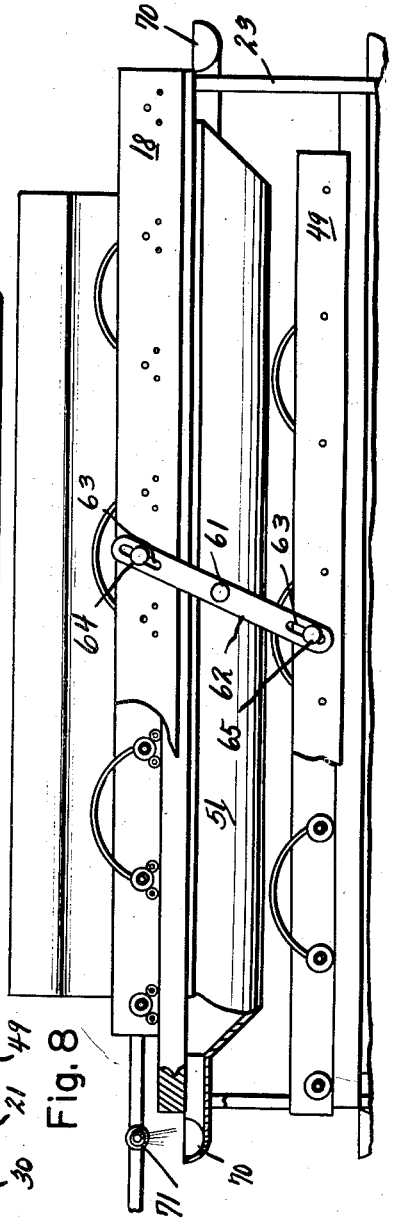
INVENTOR
FERNAND S. LAPEYRE
JAMES M. LAPEYRE
BY Wilkinson & Mawhinney
ATTORNEYS July 1, 1958

F. S. LAPEYRE ET AL 2,840,850

SHRIMP PEELING MACHINE

Filed June 15, 1954

INVENTOR
FERNAND S. LAPEYRE
JAMES M. LAPEYRE

BY Wilkinson & Mawhinney

ATTORNEYS

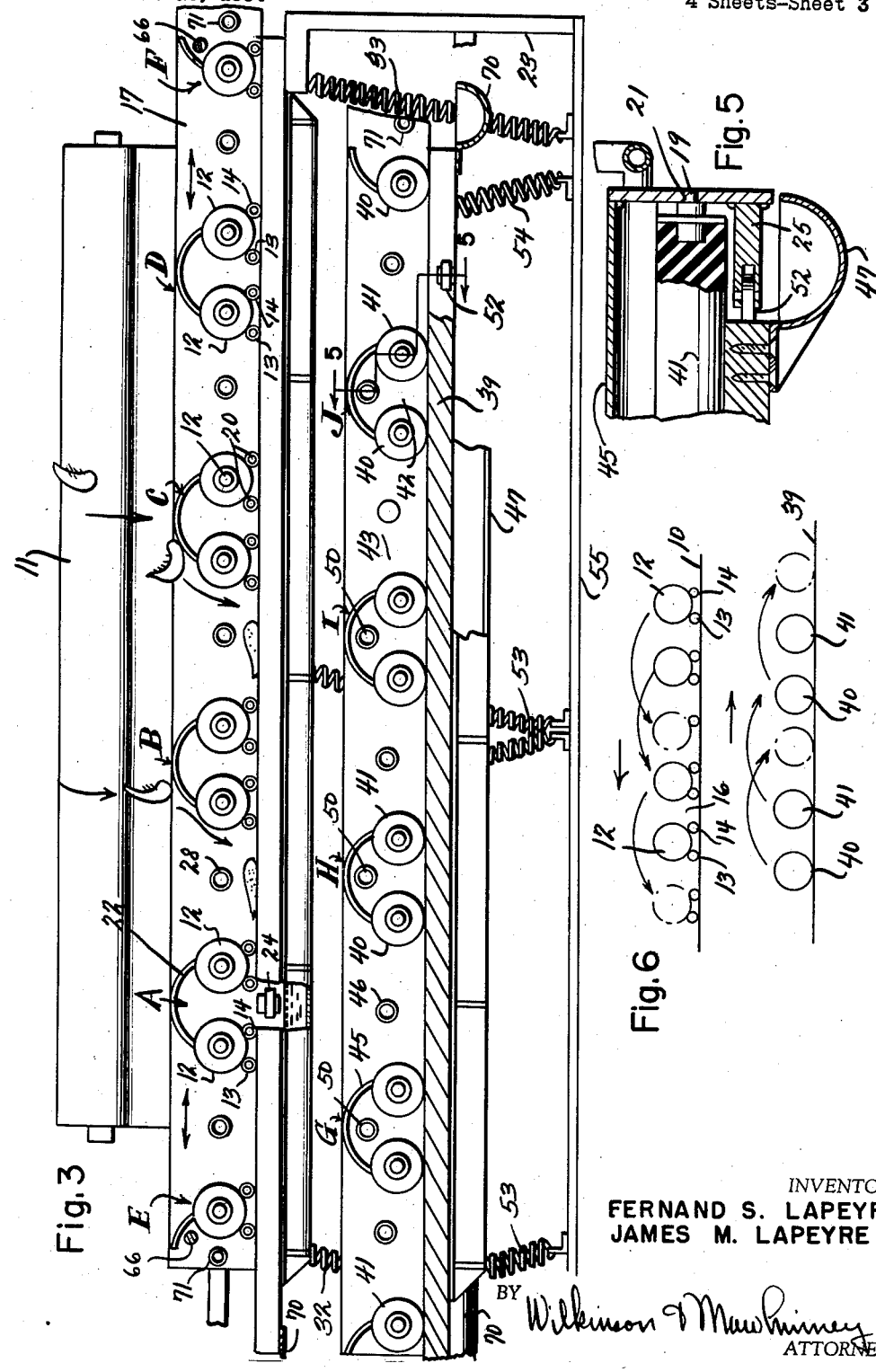

July 1, 1958

F. S. LAPEYRE ET AL 2,840,850

SHRIMP PEELING MACHINE

Filed June 15, 1954

INVENTOR
FERNAND S. LAPEYRE
JAMES M. LAPEYRE

BY Wilkinson & Mawhinney

ATTORNEYS

United States Patent Office
2,840,850
Patented July 1, 1958

2,840,850

SHRIMP PEELING MACHINE

Fernand S. Lapeyre and James M. Lapeyre, New Orleans, La., assignors to The Peelers Company, Houma, La., a partnership of Louisiana Application June 15, 1954, Serial No. 436,788

22 Claims. (Cl. 17—2)

The present invention relates to shrimp peeling machine and has for an object the expeditious shelling of the shrimp to separate the meat from the hulls and to separately deliver the shelled meat and the trash to different destinations to the end that no separating operation of trash from meat will be required subsequently to the passage of the shrimp through the machine.

Whereas in our prior Patents No. 2,537,355, granted January 9, 1951 and No. 2,574,044, granted November 6, 1951, peeling rollers were employed having a pinching and squeezing action by which the meat was expelled from the shells and the shells drawn through nips of the pinching rolls, and whereas these rollers while having a rotary or oscillating movement about their own axes were fixed in the machine against any motion of translation, it is a primary object of the present invention to mount the peeling rollers for motion of translation to the end that these peeling rollers may move to the shrimp instead of the shrimp being brought to the nips or bights between stationary peeling rollers; by reason of which, due to the inertia of the shrimp and the bodily movement of a peeling roller thereto, the momentum acquired by the roller in its movement to the shrimp will be forceful and effective to force the shrimp inot the nip provided between the advancing roller and a support or table on which the shrimp are placed, greatly facilitating the grasp of the roller upon the rather rough external shell or hull of the shrimp all to the end that the shell may be withdrawn from the meat and flattened out as it passes beneath the advancing roller with the meat being squeezed out forwardly of such advancing roller.

It is another object of the present invention to provide a machine embodying these principles which will have a large capacity for the shelling of shrimp in which groups of such peeling rollers are carried by a reciprocating frame in such spaced relationship as to afford receiving and peeling channels for the unshelled shrimp between said groups and trash disposal ways between the unit rollers of the groups into which the shells or hulls are delivered without movement of such shells or hulls but solely by the motions of translation of the peeling rollers thereover so as to facilitate the discharge of the trash fromt he machine by avenues which are separate and distinct from the shrimp receiving and peeling channels.

A still further object of the invention is to provide a shrimp peeling machine in which reciprocating frames carrying groups of spaced peeling rollers or other devices are arranged to form alternate shrimp receiving and peeling channels and trash disposal ways which channels and ways reciprocate with the frames over a table so htat the same areas of the table become alternately bases of such channels and ways, with means for advancing the shrimp through such channels and ways into preferably a plurality of sections of the machine in which the peeling rollers are of various diameters to present different angles of attack to the shrimp in successive phases of the peeling operation.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a top plan view with parts broken away and parts shown in section of a shrimp peeling machine constructed in accordance with the present invention.

Figure 3 is an enlarged longitudinal vertical sectional view taken on the line 3—3 in Figure 1.

Figure 5 is a fragmentary vertical transverse section taken on an enlarged scale on the line 5—5 of Figure 3.

Figure 6 is a diagrammatic view of the upper and lower groups of rollers showing in full and dotted lines sequential positions of the rollers incident to the reciprocating motions of translation thereof.

Figure 8 is a side elevational view of the machine showing a modified form of drive mechanism for the roller frames.

Figure 2:
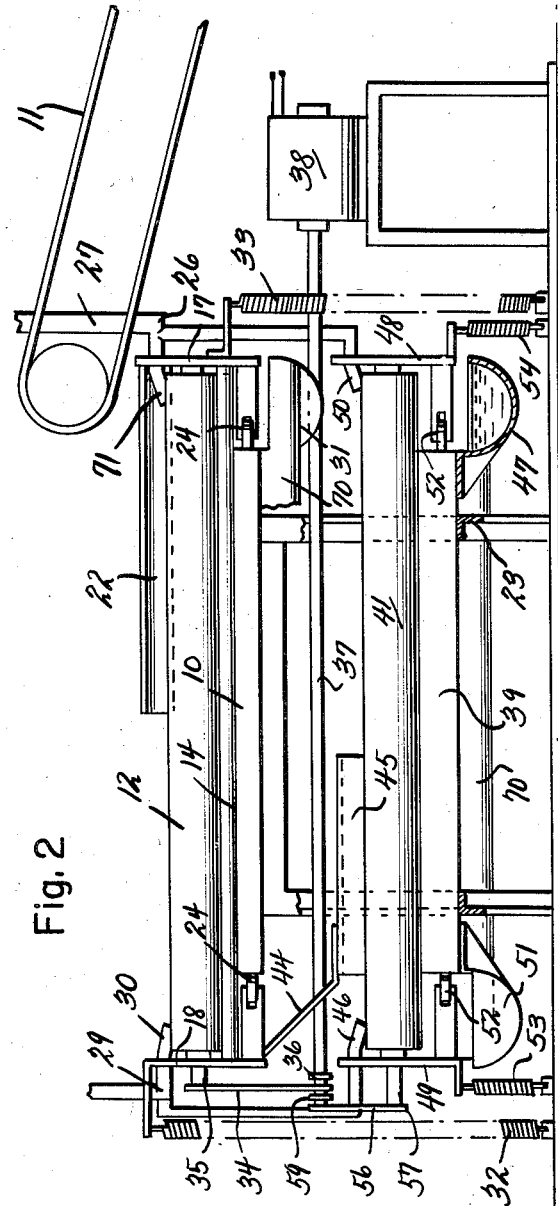
Figure 2 is an end elevational view of the same with parts shown in section.

Referring more particularly to the drawings, 10 designates an upper table on to which unshelled shrimp are delivered by conveyor 11 or other device from an adjoining source of supply.

Mounted to reciprocate upon the table 10 are one or more groups of peeling rollers. Preferably these peeling rollers are arranged in separated groups. Each group may consist of two units spaced apart. Each unit preferably consists of an arrangement of three rollers, namely a large diameter roller 12 and two small diameter rollers 13 and 14.

In the drawings four such groups of rollers are illustrated by way of example and designated by way of example as A, B, C and D. The roller units of each group are separated to provide trash disposal ways 15 therebetween, and each group is separated to provide shrimp receiving and peeling channels 16. This spacing relationship is determined and preserved by journalling the trunnions of the various rollers in appropriate bearings in side walls 17 and 18 of a reciprocating frame generally indicated at X by which the rollers of the various groups are given a reciprocating motion of translation longitudinally back and forth on the upper table 10 but their axes of rotation are held fixed against angular movement.

Figure 4:
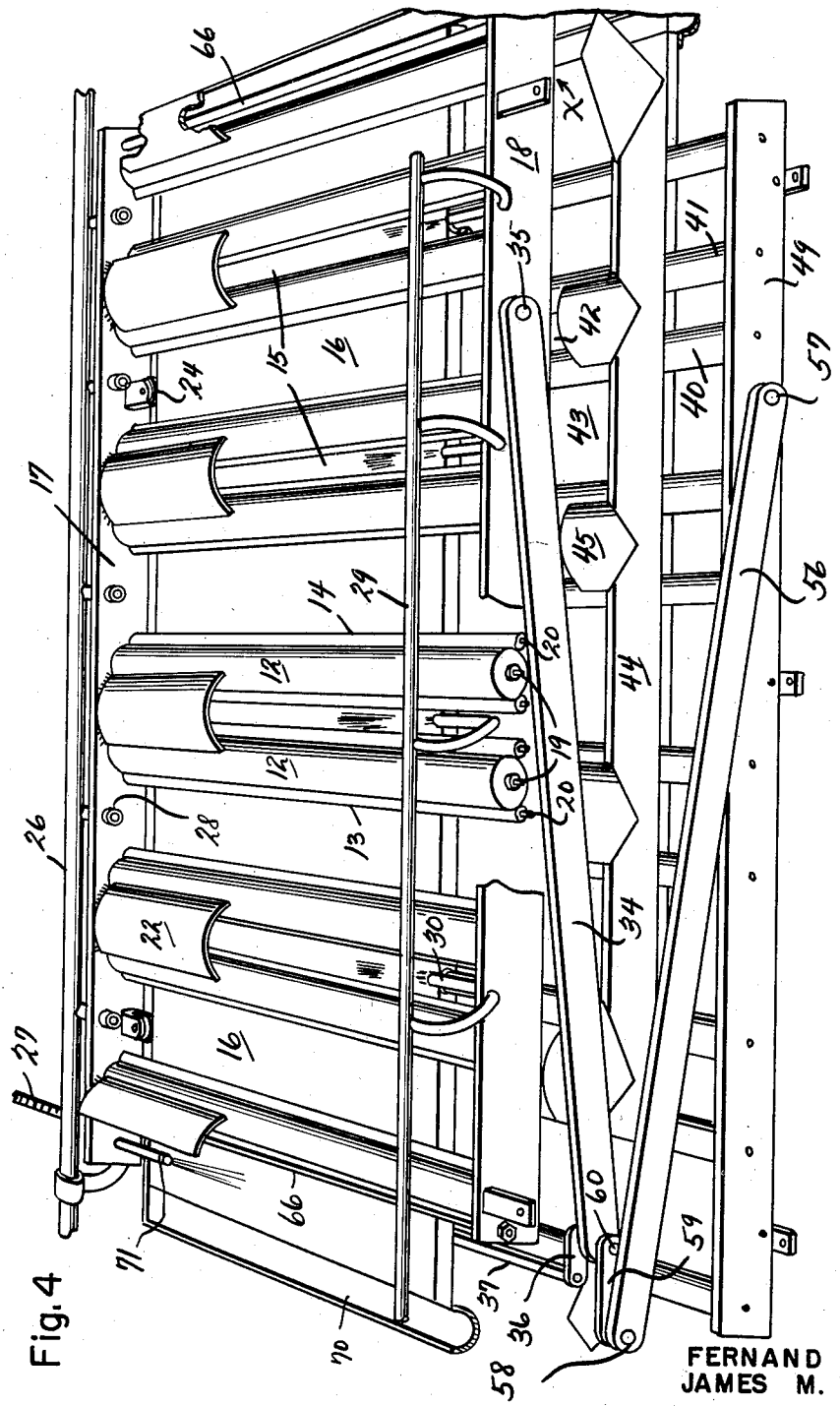
Figure 4 is a perspective view of the machine showing a form of driving mechanism.

In Figure 4 the trunnions of the large rollers 12 are indicated at 19 and the trunnions of the smaller rollers 13 and 14 at 20.

A trunnion 19 of one of the large rollers is shown as seated in a bearing 21 in a side wall 17 of the upper reciprocating frame. Hoods or shields 22 arcuately or otherwise span the distance between adjacent large rollers 12 of each group at the receiving ends of the channels, that is beneath the conveyor 11 whereby shrimp delivered by the conveyor and falling upon the shields 22 will be prevented from entering the trash disposal ways 15 and will be deflected to the channels 16.

The table 10 in the single form embodiment of the invention illustrated is stationary and carried by an appropriate machine frame 23 in which the reciprocating roller frame is appropriately mounted for reciprocating movement.

These reciprocating roller frames are guided appropriately for back and forth rectilinear motion, for example, by rollers 24 carried by brackets 25 which project inwardly from the side walls 17, 18 in position for the rollers 24 to engage the side edges of the table 10. A suitable number of these rollers 24 are mounted along the walls 17, 18 at opposite sides of the table in order to take up the lateral thrust, and to orient the reciprocating motion of the roller frames to avoid any local shifting thereof which might tend to bind or resist the motion.

At the ends of the roller frames end roller units E and F may be provided.

A liquid manifold 26 is carried by the reciprocating roller frame at the receiving or conveyor side 17 in communication with a source of water or other appropriate liquid supply through a flexible connection 27. Spray nozzles 28 connected to the manifold 26 are exposed through the side wall 17 to the channels 16.

At the other side 18 of the reciprocating roller frame is a liquid manifold 29 which may also be carried with the frame and which is in communication with a suitable source of water or other liquid supply and with nozzles 30 entered through the side wall 18 in alignment with the trash disposal ways 15.

At the side 17 extending along and beyond the edge of the table 10 at the space outwardly of such edge of the table and between the table edge and the wall 17 is a trash receiving trough 31 which extends lengthwise in common to all of the trash disposal ways and receives the separated hulls or shells and may convey the same to an appropriate disposal point.

Coil or other springs 32 and 33 are connected between the reciprocating roller frame and the machine bed, as shown more particularly in Figure 2 for imposing a resilient and yielding load on the rollers.

The roller frame may be reciprocated in any desired manner, for instance by a pitman 34 pivoted to the side wall 18 at 35, which pitman is shown in Figure 4 to be driven by a crank arm 36. The arm is made fast to a rotary shaft 37 driven by the electric or other motor 38 shown in Figure 2.

The machine is also shown to embody a second lower section involving a table 39 on which reciprocate groups G, H, I, J of peeling rollers, each group comprising two rollers 40 and 41 of substantially larger diameter than the peeling rollers 13, 14, of the upper section. The rollers 40, 41 are spaced apart to provide trash disposal ways 42 therebetween and the groups of rollers are separated from one another by channels 43 adapted to receive the peeled meat from the upper section and such shrimp which have avoided shelling in the upper section.

Such meat and unshelled shrimp, driven by the water sprays 28 drop off the edges of the table 10 adjacent the wall 18 which is spaced for this purpose from the table. Below this space is an inclined baffle 44 for deflecting the meat and unshelled shrimp down into the channels 43 of the lower section and on to hoods or shields 45 which extend above and across the rollers 40, 41 at the baffle end of the channels 43 so as to prevent the meat and unshelled shrimp from the section above from entering the trash disposal ways 42 of the lower section. Liquid nozzles 46 in communication with the manifold 29 direct water from left to right (Fig. 2) of the lower channels 43 and thus wash the peeled shrimp meat to a collecting trough 47 positioned below the space between the forward edge of the lower table 39 and the adjacent side wall 48 of the lower reciprocating roller frame which comprises also a wall 49 at the opposite end of the table.

Liquid nozzles 50 from the manifold 26 are arranged adjacent the front walls 48 of the lower section in position to discharge water or other liquid into and through the trash disposal ways 42 in reverse direction to the flow of water through the channels 43 so as to drive the trash from these ways 42 into a trash receiving trough 51 disposed between the table 39 and the side wall 49.

The rollers 40, 41 are appropriately journalled in the side walls 48 and 49 and these side walls are united in a roller reciprocating frame which is guided by the side thrust rollers 52, which are carried by the side walls 48 and 49 and engage opposite edges of the lower table 39. Coil or other springs 53 and 54 are stretched between the walls 48, 49 of the lower roller reciprocating frame and the bed 55 of the machine framework.

As shown more particularly in Figure 4, the reciprocating drive for the lower roller frame may be coupled conveniently to the drive for the upper frame. As shown, a pitman 56 is pivoted at 57 to the side wall 49 at one end and at 58 to a link 59 at its other end. The link 59 at its other end is connected to a pivot 60 passing through the pitman 34 and the crank 36.

In this way the upper and lower frames may be driven in alternately opposite directions.

In Figure 8 a modified form of drive is shown in which a drive shaft 61 is employed to rock back and forth a walking beam or lever 62 which is slotted at 63 at its ends to slidingly receive pins 64 and 65 coupled to the upper and lower reciprocating roller frames respectively. As the shaft 61 is given an oscillatory motion, the lever 62 is rocked back and forth communicating a reciprocating motion in opposite directions to the upper and lower frames.

The side walls of the frames may be connected together by tie rods 66.

In operation raw shrimp from an appropriate source is delivered by means of the conveyor 11 or other appropriate device to origin ends of the peeling channels 16 of the upper section of the machine and on to the upper table or support 10. The origin ends of these channels is adjacent the wall 17. The raw shrimp will be obliged to fall on to the table or support 10 between the groups of rollers. Any shrimp falling upon the shields 22 which are arcuate will be deflected by such shields and by the large rollers 12 into the channels 16. As the upper frame reciprocates the roller groups will be moved back and forth along the upper support 10 with the small peeling rollers 13, 14 preferably in rolling contact with the upper surface of the support 10. The springs 32, 33 acting through the reciprocating roller frames will preferably hold the peeling rollers 13, 14 down into rolling contact with the upper surface of the table.

As the frame is reciprocated the groups of rollers will be given, in addition to a rotary movement about their own axes, a motion of translation back and forth along the table 10 so that the groups of rollers will be caused to move to the shrimp lying on the table 10. As the shrimp will ordinarily be motionless on the table at least in relation to the approaching groups of rollers, the inertia of such shrimp is taken advantage of to enable the leading peeling roller 13, 14 to engage the shrimp. The roller is in the nature of an inclined plane with a downwardly moving surface which will tend to grasp the rather rough external hull of the shrimp and cause such hull to be guided to the nip between the advancing peeling roller and the upper surface of the table as the roller group advances on the shrimp. Incident to this bodily movement of the rollers and incident to the yieldable spring pressure, the hulls of the shrimp are held in the nips between the peeling rollers and table while the meat is pinched or squeezed from the hulls and is forced outwardly therefrom by the advancing peeling rollers which pass over and flatten the hulls from which the meat has been expelled. In passing over such hulls the hulls are brought into the disposal ways 15. The emptied hulls are light and they come under the influence of the water sprays 30 which sluice the hulls down the ways 15 from wall 18 to wall 17. At the exit ends of these ways the hulls drop into the trash trough 31 which runs the length of the table 10 at the side 17. In other words, this trough 31 is common to all of the trash disposal ways 15.

The small diameter peeling rollers 13, 14 have small angles of attack most favorable for dealing with the raw shrimp. The rollers 12 act as backing rollers and extend preferably the full length of the small diameter peeling rollers 13, 14 to hold these rollers up to their work. In other words, such small rollers 13, 14 might have a tendency to arch from one side wall to the other under the counteraction incident to these rollers passing over and exerting pressure against large shrimp. By way of example, the small rollers 13 and 14 are preferably constructed of metal. The large rollers 12 should be relatively hard and are constructed of rubber, rubber-covered metal, fiber or plastic. The tables are preferably rubber or of plastic-covered material or of fiber.

The channels 16 and the ways 15 will move back and forth with the reciprocating groups of rollers but the water nozzles 28, 30 travel with the frames and the troughs 31, 47 and 51 extend throughout the lengths of the supports 10 and 39.

As the rollers groups reciprocate back and forth, they do not interfere with the peeled meat which is slick and slimy and which therefore escapes from the advancing peeling rollers.

Figure 7:
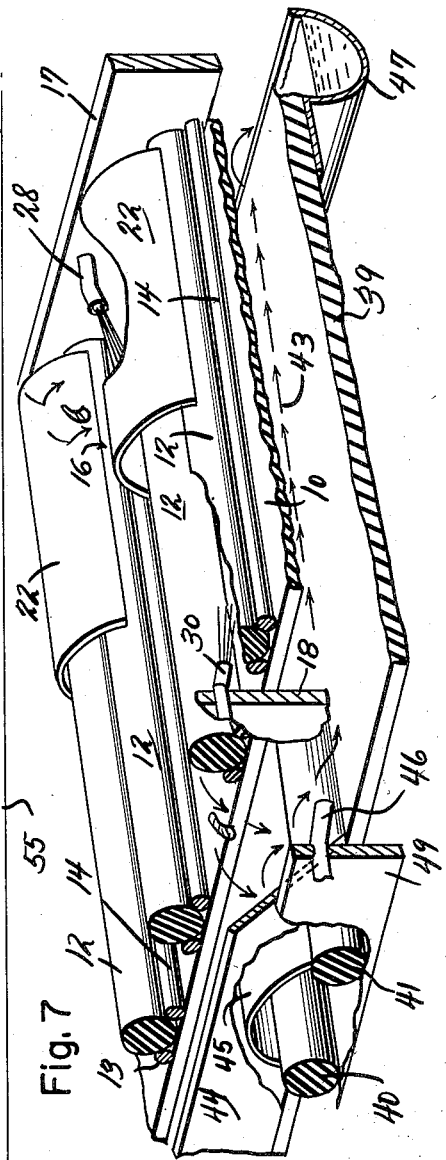
Figure 7 is a fragmentary perspective view illustrating more clearly the path of the shrimp through the upper and lower sections of the machine.

While as before stated the shrimp in the channels 16 do not move appreciably toward or from the groups of peeling rollers, such shrimp is moved gradually through the channels 16 from the origin side 17 to exit or terminal ends adjacent the wall 18 at which point the expelled meat and the unshelled shrimp drop onto the baffle 44 and are deflected to the channels 43 of the lower section of the machine and on to the lower table or support 39. At this point the shields 45 deflect the shrimp from the disposal ways 42 of the lower table 39. The nozzles 46 sluice water or other liquid through the lower channels 42 in a direction which is the reverse of that in the upper section as shown by the arrows in Figure 7. In the lower section the peeled meat will pass through the channels 43 without interference from the reciprocating rollers 40, 41 and such meat will eventually be sluiced to the trough 47 from which the meat is moved to a suitable destination.

The lower roller groups 40, 41 are also reciprocated and their action is similar in that they are given a motion of translation and bodily moved toward the shrimp on the lower table 39. These rollers are also under the influence of the springs 54 which exert a yieldable pressure of the rollers downwardly upon the unshelled shrimp to peel the same by a pinching or squeezing action, the shells passing to the disposal ways 42 from which they are sluiced into the trough 51. These rollers 40, 41 are of large diameter compared to the diameters of the peeling rollers 13, 14 of the upper section so that the angle of attack of the lower peeling rollers 40, 41 is much greater. In other words, these larger rollers 40, 41 deal with the shrimp which the rollers in the upper section have not been able to adequately peel.

It will be noted that in the machine not only are the shrimp shelled or peeled, but the hulls or shells are separated from the meat so that no further separation is necessary subsequent to the passage of the shrimp through the machine.

It will be appreciated that any suitable mechanism may be employed to drive the peeling roller frames and that these frames may be driven in alternate phase or they may be driven simultaneously back and forth together.

End waste troughs 70 extend along the end edges of the tables and may communicate with the longitudinal trash trough 31 and/or trash trough 51. Liquid sprays 71 are arranged to wash the hulls separated by the units E and F and 41 of the lower table into and along the end waste troughs 70.

In this simple form the weight of the roller might be depended upon, absent spring load, for creating the necessary pressure by gravity to cause effective peeling of the shrimp. Particularly would this be true where the roller was carried by a movable frame.

The action of peeling may be described as a pinching or squeezing operation or in some instances an unraveling operation in which an end or portion of the hull is caught in the nip between the peeling roller and the support and as the roller advances the shell is stripped from the meat as the meat is pushed forwardly of the advancing peeling roller.

The motor drive is preferably through a variable speed electric motor as in some instances it is desirable to drive the reciprocating roller frames at higher rates of speed than at other times dependent upon the nature, character, size and differing physical structure of different species of shrimp in order that the peeling rollers may advance upon the shrimp with sufficient speed to avoid simply pushing the unshelled or raw shrimp in front of the rollers without the rollers taking hold of the hulls. The inertia of the shrimp combined with adequate roller speed will always entrain the hulls with the nips so as to secure effective peeling action. The operator of the machine will be able by empirical tests to determine the proper rate of speed in any particular instance.

In the prior patents aforesaid, the peeling nips were between adjacent rollers whereas in the present invention the nips are between flat surfaces of the tables on the one hand and the curvilinear surfaces of the rollers on the other hand. The flat surfaces bisect the nips and tend to reduce the size of the mouth leading to the nips so that a more immediate grasp of the hulls by the nips is had.

It will be appreciated that only a single embodiment of the invention has been illustrated and that the invention is susceptible of incorporation in other forms so that we do not wish to be limited except by the following claims.

What is claimed is:

1. A machine for peeling shrimp or the like comprising a support for the shrimp, a rotary and longitudinally traveling roller the axis of which is longitudinally displaceable with respect to said support dividing the support into a peeling channel and a trash disposal way, and means to reciprocate the roller on the support to encounter the shrimp in the channel and squeeze the meat from the hull and passing over the hull to expose such hull to the disposal way, and means for removing the trash from the disposal way.

2. A machine for peeling shrimp or the like comprising a support for the shrimp, a roller the axis of which is longitudinally displaceable with respect to said support and bodily movable toward and from the shrimp and acting to pinch the shrimp against the support to eject the meat from the hull, said roller defining in advance thereof a peeling channel and with the opposite side a trash disposal way, and means for moving the shrimp and meat through the channel and the hulls through the way.

3. A machine for peeling shrimp or the like comprising a substantially flat support for the shrimp, a roller axially longitudinally movable bodily along the support and against the shrimp in a pinching action, and means contacting the roller to maintain the same up to its work.

4. A machine for peeling shrimp or the like comprising a support for the shrimp, a roller of relatively small diameter movable bodily along the support toward the shrimp and against the shrimp in a rolling action to pinch the shrimp against the support, and a second backing roller of larger diameter than the first-named roller and in rolling contact with said first-named roller above the support.

5. A machine for peeling shrimp or the like comprising a support for the shrimp, a unit of three rollers comprising two peeling rollers of small diameter defining a trash removal way therebetween spaced along the support and a third backing roller of larger diameter than the peeling rollers in rolling contact with both peeling rollers above the support, and means for bodily moving said unit toward the shrimp on the support with the leading peeling roller riding on the shrimp to pinch the meat from the hull and directing the trash into said disposal way in a direction opposite to the direction of travel of the peeled shrimp.

6. A machine for peeling shrimp or the like comprising a support for the shrimp, a group of peeling rollers spaced apart along the support and defining therebetween a trash disposal way and at opposite sides of the group peeling channels, means for relatively moving said group along the support to approach shrimp lying on the support and to pinch the same against the support to eject the meat from the hulls and to pass the hulls to the trash disposal way for removal from said support in a direction opposite to the direction of travel of the peeled shrimp.

7. A machine for peeling shrimp or the like comprising a support for the shrimp, a group of peeling rollers spaced apart along the support and defining therebetween a trash disposal way and at opposite sides of the group peeling channels, means for bodily reciprocating said group of peeling rollers along the support to approach shrimp lying on the support and to pinch the same against the support to eject the meat from the hulls and a pass the hulls to the trash disposal way, means for moving the unshelled shrimp and the meat through the channel, and means for moving the trash through the disposal way.

8. A machine for peeling shrimp or the like comprising a support for the shrimp, a group of peeling rollers spaced apart along the support in peeling association therewith and defining therebetween a trash disposal way and at opposite sides of the group peeling channels, means for bodily reciprocating said group of peeling rollers along the support to approach shrimp lying on the support and to pinch the same against the support to eject the meat from the hulls and to pass the hulls to the trash disposal way, means for supplying raw shrimp to the channels, and shields spanning the disposal way between the rollers to avoid entrance of raw shrimp thereto.

9. A machine for peeling shrimp or the like comprising supports for the shrimp spaced one above the other, rollers the axis of rotation of which are bodily movable along the supports in peeling association therewith and defining peeling channels at one side and trash disposal ways at the other side, means to move raw shrimp and peeled meat through one of the channels and into the channel of the other support, and means for evacuating the disposal ways of both supports.

10. A machine for peeling shrimp or the like comprising vertically spaced supports for shrimp, reciprocating frames operatively associated with said supports, peeling rollers rotatably mounted in and bodily movable with said reciprocating frames and positioned relatively to the respective supports to strike the shrimp thereon and pinch the shrimp against the supports to eject the meat from the hulls, said rollers defining at one side peeling channels and at the other side trash disposal ways and having their axes of rotation shiftable with respect to said support, means for feeding raw shrimp to an origin end of the channel of the upper support, means for moving the shrimp to and off the opposite end of the channel, deflecting means for intercepting the falling shrimp and meat and guiding the same into the peeling channel of the lower support, means for moving the raw shrimp and peeled meat through the last-named channel, and means for evacuating both disposal ways of the trash.

11. A machine for peeling shrimp or the like comprising upper and lower supports for shrimp, reciprocating frames operatively associated with said supports, groups of peeling rollers journaled in said frames and bodily movable longitudinally of the supports with the frames in peeling association with said supports, means for exerting pressure load on the rollers downwardly toward the supports, means for longitudinally reciprocating said frames and rollers, said roller groups each comprising at least two peeling rollers spaced apart to provide trash disposal ways, said groups being spaced apart to provide peeling channels therebetween, means for supplying raw shrimp to origin ends of the channels of the upper support, shields extending arcuately over the group rollers at least adjacent such origin ends, means to move the raw shrimp and peeled meat from the origin ends of the upper channels over the opposite edges of the supports, a baffle between the supports at such opposite end in position to intercept the raw shrimp and peeled meat and deflect the same to the channels of the lower support, shields over the group rollers adjacent said baffle, means for moving the raw shrimp and meat through the lower channels from the baffle ends to opposite outlet ends, and means for evacuating the disposal ways of both upper and lower supports.

12. A machine for peeling shrimp or the like comprising upper and lower supports for the shrimp, upper groups of rollers for the upper support each group comprising at least two units of three rollers each comprising lower small diameter peeling rollers spaced apart along the upper support and a large diameter backing roller in rolling contact with both peeling rollers, said units being spaced apart to provide trash disposal ways therebetween, said groups being spaced apart to provide peeling channels therebetween, means for supplying liquid to origin ends of the channels to move raw shrimp and peeled meat from such origin ends to terminal ends, means for supplying a liquid stream to the disposal ways to sluice the trash therefrom, a frame in which all of said rollers are journaled for rotation, resilient means acting downward on said frame to exert yieldable pressure on the peeling rollers against the upper support and shrimp, lower groups of peeling rollers for the lower support, each lower group comprising two rollers of relatively large diameter spaced apart to provide trash disposal ways, said lower groups being spaced from one another to provide lower peeling channels, a reciprocating frame in which the rollers of the last mentioned groups are journaled for rotation, said lower frame reciprocating along the lower support, a baffle between the supports positioned to deflect the raw shrimp and peeled meat from the terminal ends of the upper channels to origin ends of the lower channels, fluid means for moving the shrimp and meat through the lower channels, means to reciprocate said frames, and means for guiding the frames in their reciprocating motion.

13. A machine for peeling shrimp comprising at least two peeling rollers defining therebetween a trash disposal way, a shrimp support operatively associated with said peeling rollers in peeling association therewith, and means associated with said peeling rollers and support whereby said peeling rollers and support are moved relative to each other in peeling association depositing the trash removed from the shrimp being peeled in said trash disposal way for removal from said machine separately from the peeled shrimp.

14. A machine for peeling shrimp comprising a support for receiving shrimp, a pair of spaced apart peeling rollers defining a trash removal way therebetween and a shrimp peeling way outwardly of said peeling rollers, said rollers being positioned in peeling association with said support, means associated with said rollers and support for imparting relative peeling movement therebetween, and means associated with said trash removal and peeling ways on said support to convey trash and peeled shrimp in opposite directions over said support.

15. A machine for peeling shrimp comprising at least two sets of spaced apart rollers, a support adapted to receive shrimp thereon and being in peeling association with said rollers, the space between each roller of a set defining a trash disposal way and the space between each set of rollers defining a peeling and shrimp receiving way, and means associated with said rollers and support for imparting relative peeling movement therebetween whereby the shrimp in said peeling way is subjected to the peeling action of said rollers and support and the trash removed from the then peeled shrimp is deposited in the trash disposal way for discharge from said machine separately from the peeled shrimp.

16. A machine for peeling shrimp comprising a support for receiving shrimp thereon, a pair of peeling rollers spaced apart from each other to define a trash removal way, and means operatively associated with said support and rollers to reciprocate said rollers over said support to peel shrimp therebetween directing the peeled shrimp meats outwardly of said rollers and the trash removed from such shrimp inwardly to lie upon said support and be separated from the peeled shrimp meats by said peeling rollers.

17. A shrimp peeling machine comprising a first member constituting a shrimp support and peeling means, a second peeling member operatively associated with the first member to peel shrimp and also to partition the area of the support into trash and peeled shrimp ways, means to bodily move one member relative to the other member whereby the ways progress along successive areas of the first member incident to the peeling and separating action of the members, disposal means for removing the peeled meat and the trash from said ways, one such disposal means movable with the movable member.

18. A shrimp peeling machine comprising a first member constituting a shrimp support and peeling means, a second peeling member operatively associated with the first member to peel shrimp and having spaced peeling means to partition the area of the support into a trash way between the spaced peeling means and peeled shrimp ways in front and rear of the second member, means to bodily move one member back and forth relative to the other member whereby the ways progress along successive areas of the first member incident to the peeling and separating action of the members, and disposal means for removing the peeled meat and the trash from said ways.

19. A machine for separating the hulls from the meat of shrimp comprising a shrimp support including a substantially rigid flat surface supporting the shrimp during the separating operation, first and second rotary separating members operatively associated with said rigid flat surface, and means associated with one of said members and said support to cause relative bodily reciprocatory movement between said members and said rigid flat surface of said support whereby to separate the hulls from the meat of said shrimp.

20. A machine for separating the hulls from the meat of shrimp comprising a flat rigid shrimp supporting and separating member, at least one separating member operatively associated with said first member, and means associated with one of said members to cause relative bodily rectilinearly reciprocatory movement between said members whereby to separate the hulls from the meat of said shrimp.

21. A shrimp peeling machine comprising a rigid flat peeling support member for shrimp, at least one rotary peeling member in operative peeling association with said rigid flat support for peeling the shrimp between the said flat support and said rotary peeling member, said rotary peeling member having an axis of rotation fixed against angular movement, and means associated with one of said members to cause relative bodily movement between said members for placing the members and shrimp in shrimp peeling position whereby the shrimp are peeled on said rigid flat support.

22. A shrimp peeling machine as claimed in claim 21 wheerin said rotary peeling member extends substantially entirely across said rigid flat support member.

References Cited in the file of this patent
UNITED STATES PATENTS

| | | |
|---|---|---|
| 2,537,355 | Lapeyre et al. | Jan. 9, 1951 |
| 2,574,044 | Lapeyre et al. | Nov. 6, 1951 |
| 2,637,065 | Lapeyre et al. | May 5, 1953 |
| 2,660,754 | Roshko | Dec. 1, 1953 |